E. H. ANGLE.
ORTHODONTIC IMPLEMENT.
APPLICATION FILED JAN. 25, 1918.
1,299,102.
Patented Apr. 1, 1919.
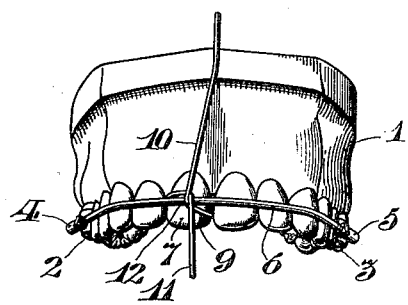
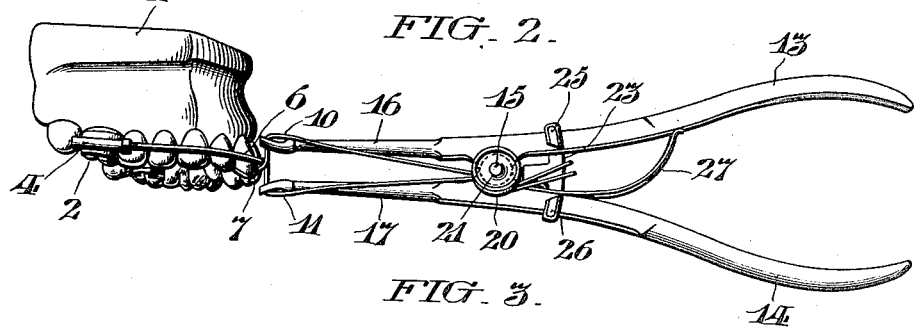
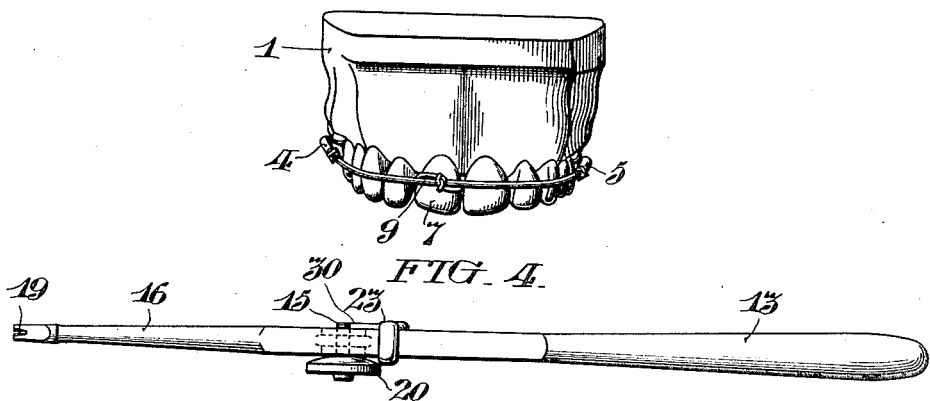
Inventor
Edward H. Angle,
By Clifton C. Callowell
Attorney
Witness
William J. Bissell

UNITED STATES PATENT OFFICE.

EDWARD H. ANGLE, OF PASADENA, CALIFORNIA.

ORTHODONTIC IMPLEMENT.

1,299,102. Specification of Letters Patent. Patented Apr. 1, 1919.

Application filed January 25, 1918. Serial No. 213,731.

*To all whom it may concern:*

Be it known that I, EDWARD H. ANGLE, a citizen of the United States, and a resident of Pasadena, in the county of Los Angeles, State of California, have invented certain new and useful Improvements in Orthodontic Implements, of which the following is a specification, reference being had to the accompanying drawings.

My invention relates particularly to that class of orthodontic implements that are adapted to facilitate the attachment of the teeth to the tooth correcting appliances, and is especially directed to an implement for tightening and locking ligatures by which the teeth are secured to the arch-bar.

It has been common practice to attach the ligature and secure it by twisting, either by use of the operator's fingers, or with the aid of a pair of ordinary pliers. This method has proven to be most unsatisfactory, as by it, the ligature cannot be drawn to its maximum tightness, and consequently the operation of straightening or correcting the malposed teeth of the dental arch is unduly prolonged.

The principal objects of my invention are to provide an implement that will not only effectively draw the ligature to the requisite tightness to afford the best results, but which may be employed to effect such locking of the ligature as to insure its permanent retention, and thereby produce the maximum efficiency.

Other objects of my invention are to provide an implement that may be employed with the least discomfort to the patient, and so adjusted as to relieve the operator of the responsibility of grasping the handles of said implement after the desired tension on the ligature is effected.

My invention further comprehends an orthodontic implement having coöperative tension effecting means, for retaining the ligature while being applied to the teeth.

Specifically stated the form of my invention as hereinafter described comprises a pair of handles having bifurcated beaks intermediately pivoted, said beaks being arranged to separate upon the approach of said handles, and to exert tension upon the ligature, which after extending around the tooth, may have its oppositely extending portions extended through the slots formed by the bifurcations of the respective beaks, and said portions conveniently secured to the tension effecting means, comprising a tension button on said implement.

My invention also includes all of the various novel features of construction and arrangement as hereinafter more definitely described.

In the accompanying drawings Figure 1, is a perspective front elevational view of an upper dental arch, showing an orthodontic appliance comprising an arch-bar attached thereto and having a ligature embracing a malposed tooth and arch-bar, and extended oppositely therefrom in position to be engaged by the orthodontic implement herein contemplated; Fig. 2, is a perspective side elevational view of the dental arch shown in Fig. 1, showing the ligature locking implement in operative position to apply the ligature; Fig. 3, is a perspective front elevational view of the model of the dental arch illustrated in Fig. 1, showing the ligature applied; Fig. 4, is a plan view of the ligature locking implement; and Fig. 5, is a perspective view of the locking yoke, which is adjustable on the handles of said implement to hold the ligature under tension while being twisted and locked.

In said figures I have, for convenience of illustration, shown my implement in coöperative relation with orthodontic appliances attached to the teeth as embodied in a model of the upper jaw, but it is to be understood that such appliances and implements are designed for application to the natural teeth of the human jaw.

The jaw model 1, shown in Figs. 1, 2 and 3, embodies the upper dental arch having teeth 2 and 3, to which the terminal anchorages 4 and 5, carrying the arch-bar 6, are conveniently secured in a well known manner.

The arch-bar 6, tends to force the malposed teeth of the dental-arch into proper alinement, and as is obvious, any of the teeth intermediate of the anchor teeth 2 and 3, as for instance the tooth 7, may be attached thereto for correction, by the ligature 9, preferably formed of wire, which may be looped around the back of the malposed tooth and drawn tightly over the front of the arch-bar with its free end portions 10 and 11, extended in opposite directions, preferably normal to said arch-bar to form the half-turn 12, as illustrated in Fig. 1.

The orthodontic implement embodying my invention is conveniently shown in Fig. 2, as applied to said ligature and comprises the handles 13 and 14, pivoted at 15, and respectively terminating forwardly in beaks 16 and 17, which have their free oppositely deflected ends bifurcated by the alined slots 19, as best shown in Fig. 4, through which the respective oppositely directed end portions 10 and 11, of the ligature 9, pass, as shown in Fig. 2.

Said implement is provided with the tension button, comprising the flanged head 20, on the pintle 21, which forms the pivot about which the handles and their respective beaks oscillate, and about which the free end portions 10 and 11, of the ligature 9, may be wrapped and secured behind the flanged head 20, so as to provide such tension on said ligature that when the handles 13 and 14, are caused to approach, the respective beaks 16 and 17, will be forced apart to exert such tension upon said ligature that the tooth 7, and arch-bar 6, will be rigidly secured together thereby.

The implement is also provided with the locking yoke 23, having the opposed fingers 25 and 26, embracing the handles 13 and 14, and said yoke is slidably adjustable thereon to lock the beaks 16 and 17, separated in opposition to the spring 27, between the handles 13 and 14, when the desired tension is effected upon the oppositely directed portions of the ligature 9.

Having thus subjected the ligature to the desired tension, the implement may be rotated upon its longitudinal axis to so twist the ligature 9, as to effect a locking together of the oppositely directed portions of said ligature, which may be preferably first severed adjacent to the free ends of the beaks 16 and 17, and then the projecting ends, after being pressed back by the thumb of the operator, be trimmed close to the twist formed by the rotation of said implement, as shown in Fig. 3.

As best shown in Figs. 4 and 5, the yoke 23, is provided with a forwardly extending lug 30, arranged to engage the pintle 21, serving as a stop, as best shown in Fig. 4, to limit the forward movement of said yoke.

It will be obvious that by the use of such an implement, there can be no lost motion between the tooth and arch-bar and therefore the greatest possible efficiency is thus afforded.

I do not desire to limit my invention to the precise details of construction and arrangement as herein set forth, as it is obvious that various modifications may be made therein without departing from the spirit of the invention as defined in the appended claims.

Having thus described my invention, I claim:—

1. An implement of the class described, comprising a pair of handles having slotted ligature engaging beaks intermediately pivoted, means tending to separate said handles, a yoke slidable on said handles operative to lock said beaks separated, and a tension button projecting from said implement, to which said ligature may be engaged.

2. An implement of the class described, comprising a pair of handles having slotted ligature engaging beaks intermediately pivoted, means tending to separate said handles and cause said beaks to approach, means arranged to lock said beaks separated, and having a projection extended to provide a stop therefor, and means for holding a ligature extending through the slots in said beaks.

3. An implement of the class described, comprising a pair of handles having slotted ligature engaging beaks intermediately pivoted, means tending to separate said handles, means arranged to lock said beaks separated, and means having an axis co-incident with the axis of oscillation of said handles for holding a ligature extending through the slots in said beaks.

In witness whereof, I have hereunto set my hand this 7th day of January, A. D., 1918.

EDWARD H. ANGLE.

Witnesses:
S. L. BIERBANE,
LURA C. KISHBAUGH.